(12) United States Patent
Motoki et al.

(10) Patent No.: US 8,094,432 B2
(45) Date of Patent: *Jan. 10, 2012

(54) MULTILAYER CERAMIC ELECTRONIC COMPONENT AND METHOD FOR MANUFACTURING THE SAME

(75) Inventors: Akihiro Motoki, Fukui (JP); Makoto Ogawa, Fukui (JP); Shunsuke Takeuchi, Echizen (JP); Kenichi Kawasaki, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 347 days.

This patent is subject to a terminal disclaimer.

(21) Appl. No.: 12/356,648

(22) Filed: Jan. 21, 2009

(65) Prior Publication Data

US 2009/0279229 A1    Nov. 12, 2009

(30) Foreign Application Priority Data

May 12, 2008   (JP) ................. 2008-125003

(51) Int. Cl.
*H01G 4/06*   (2006.01)
(52) U.S. Cl. ............... 361/321.2; 361/321.1; 361/306.1; 361/306.3; 361/311; 361/313
(58) Field of Classification Search .............. 361/321.2, 361/321.1, 311–313, 306.1, 306.3, 300–305; 333/186, 187
See application file for complete search history.

(56) References Cited

U.S. PATENT DOCUMENTS

| | | | |
|---|---|---|---|
| 5,712,758 A * | 1/1998 | Amano et al. .............. 361/321.2 |
| 6,344,963 B1 * | 2/2002 | Mori ........................... 361/306.3 |
| 6,356,430 B1 * | 3/2002 | Yoshida et al. .............. 361/305 |
| 6,898,069 B2 * | 5/2005 | Yamaguchi et al. .......... 361/303 |
| 6,960,366 B2 | 11/2005 | Ritter et al. |
| 6,972,942 B2 | 12/2005 | Ritter et al. |
| 6,982,863 B2 | 1/2006 | Galvagni et al. |
| 6,984,543 B2 * | 1/2006 | Mihara et al. .................. 438/55 |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |

(Continued)

FOREIGN PATENT DOCUMENTS

JP         63-169014 A    7/1988

(Continued)

OTHER PUBLICATIONS

Motoki et al., "Multilayer Electronic Component and Method for Manufacturing the Same", U.S. Appl. No. 12/110,484, filed on Apr. 28, 2008.

(Continued)

*Primary Examiner* — Nguyen T Ha

(74) *Attorney, Agent, or Firm* — Keating & Bennett, LLP

(57) ABSTRACT

A method for manufacturing a multilayer ceramic electronic component includes a first substep of depositing precipitates primarily made of a specific metal on an end of each of internal electrodes exposed at a predetermined surface of a laminate and growing the precipitates to coalesce into a continuous plated sublayer, and a second substep of heat-treating the laminate including the plated sublayer at a temperature of at least about 800° C., wherein a plated layer including a plurality of plated sublayers is formed by continuously performing at least two cycles of the first substep and the second substep.

7 Claims, 3 Drawing Sheets

U.S. PATENT DOCUMENTS

| | | | |
|---|---|---|---|
| 7,276,836 B2 * | 10/2007 | Umeda et al. | 310/320 |
| 7,295,421 B2 * | 11/2007 | Mihara et al. | 361/308.1 |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,859,823 B2 * | 12/2010 | Suzuki | 361/321.1 |
| 2005/0046536 A1 | 3/2005 | Ritter et al. | |
| 2007/0014075 A1 | 1/2007 | Ritter et al. | |
| 2008/0081200 A1 | 4/2008 | Katsube et al. | |
| 2008/0118721 A1 | 5/2008 | Horie et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2009/0280319 A1 * | 11/2009 | Iwanaga et al. | 428/336 |

FOREIGN PATENT DOCUMENTS

| | | |
|---|---|---|
| JP | 2007-043144 A | 2/2007 |

OTHER PUBLICATIONS

Iwanaga et al., "Monolithic Ceramic Electronic Component and Method for Manufacturing the Same", U.S. Appl. No. 12/405,370, filed on Mar. 17, 2009.

Kayatani et al., "Multilayer Ceramic Electronic Component and Method for Making the Same", U.S. Appl. No. 12/469,799, filed on May 21, 2009.

Iwanaga et al., "Multilayer Ceramic Electronic Component and Method for Producing Same", U.S. Appl. No. 12/405,372, filed on Mar. 17, 2009.

Takeuchi et al., "Multilayer Ceramic Electronic Component and Manufacturing Method Thereof", U.S. Appl. No. 12/340,570, filed on Dec. 19, 2008.

Nishihara et al., "Laminated Ceramic Electronic Component and Manufacturing Method Thereof", U.S. Appl. No. 12/617,879, filed on Nov. 13, 2009.

Kobayashi et al., "Multilayer Ceramic Electronic Component and Method for Making the Same", U.S. Appl. No. 12/490,471, filed on Jun. 24, 2009.

Takeuchi et al., "Multilater Electronic Component and Method for Manufacturing the Same", U.S. Appl. No. 12/817,352, filed on Jun. 17, 2010.

Saruban et al., "Laminated Ceramic Electronic Component and Manufacturing Method Therefor", U.S. Appl. No. 12/821,305, filed Jun. 23, 2010.

* cited by examiner

MULTILAYER CERAMIC ELECTRONIC COMPONENT AND METHOD FOR MANUFACTURING THE SAME

BACKGROUND OF THE INVENTION

1. Field of the Invention

The present invention relates to a multilayer ceramic electronic component and a method for manufacturing the multilayer ceramic electronic component and, in particular, to a multilayer ceramic electronic component in which external electrodes are directly formed on the surface of a laminate by plating and a method for manufacturing the multilayer ceramic electronic component.

2. Description of the Related Art

As illustrated in FIG. 3, a multilayer ceramic electronic component 101, such as a multilayer ceramic capacitor, generally includes a laminate 102, which includes ceramic layers 103 and internal electrodes 104 and 105 alternately disposed between the ceramic layers 103. An end of each of the internal electrodes 104 is exposed at an end surface 106 of the laminate 102. An end of each of the internal electrodes 105 is exposed at an end surface 107. External electrodes are formed on the end surfaces 106 and 107 to electrically connect the corresponding ends of the internal electrodes 104 and 105.

Typically, the external electrodes are formed as follows. First, a metal paste including a metal component and a glass component is applied to the end surfaces 106 and 107 of the laminate 102 and is baked to form paste electrode layers 108 and 109. First plated layers 110 and 111 made primarily of, for example, Ni are then formed on the paste electrode layers 108 and 109. Second plated layers 112 and 113 made primarily of, for example, Sn are then formed on the first plated layers 110 and 111. Thus, the external electrodes have a three-layer structure including the paste electrode layers 108 and 109, the first plated layers 110 and 111, and the second plated layers 112 and 113.

The external electrodes are required to have good solder wettability so that the multilayer ceramic electronic component 101 can be securely soldered to a substrate. The external electrodes are also required to electrically connect the corresponding internal electrodes, which are insulated from each other. The second plated layers 112 and 113 provides good solder wettability to the multilayer ceramic electronic component 101. The paste electrode layers 108 and 109 electrically connect the internal electrodes 104 and 105. The first plated layers 110 and 111 prevent solder leaching.

However, the paste electrode layers 108 and 109 have a relatively large thickness such as several tens to several hundreds of micrometers. Thus, in a multilayer ceramic electronic component 101 having a specified volume, the paste electrode layers 108 and 109 reduce the effective volume for capacitance. In contrast, the first plated layers 110 and 111 and the second plated layers 112 and 113 have a relatively small thickness such as several micrometers. Accordingly, if the external electrodes are formed only of the plated layers, the effective volume for capacitance can be increased.

For example, Japanese Unexamined Patent Application Publication No. 63-169014 discloses a method for depositing an electroconductive metal layer by electroless plating on side surfaces of a laminate at which internal electrodes are exposed so that the exposed internal electrodes are connected to each other.

However, in this method, a plating solution tends to enter the laminate from the side surfaces at which the internal electrodes are exposed. Heat treatment to remove water in the plating solution after plating may cause blisters on the surface of a plated layer, thus impairing the appearance. The plated layer in contact with a side surface at which the internal electrodes are exposed should have a thickness of at least about 5 μm to ensure an electrical connection between the internal electrodes. However, the number of blisters increases significantly with the thickness of the plated layer increases.

SUMMARY OF THE INVENTION

To overcome the problems described above, preferred embodiments of the present invention provide a multilayer ceramic electronic component which includes external electrodes defined only by one or more plated layers and a method for manufacturing the multilayer ceramic electronic component.

According to a preferred embodiment of the present invention, a method for manufacturing a multilayer ceramic electronic component includes the steps of preparing a laminate that includes laminated ceramic layers and a plurality of internal electrodes disposed between the ceramic layers, an end of each of the internal electrodes being exposed at a predetermined surface of the laminate, and forming a plated layer on the predetermined surface of the laminate to electrically connect the ends of the internal electrodes to each other.

The step of forming a plated layer preferably includes a first substep of depositing precipitates primarily made of a specific metal on the end of each of the internal electrodes exposed at the predetermined surface of the laminate and growing the precipitates to coalesce into a continuous plated sublayer, and a second substep of heat-treating the laminate including the plated sublayer at a temperature of at least about 800° C., wherein a plated layer including a plurality of plated sublayers is formed by continuously performing at least two cycles of the first substep and the second substep.

Preferably, each of the plated sublayers has a thickness in the range of about 0.1 μm to about 5 μm, for example.

Preferably, the specific metal in the plated layer is Cu or Ni, for example.

A multilayer ceramic electronic component manufactured by a method for manufacturing a multilayer ceramic electronic component according to a preferred embodiment of the present invention has the following structural features. That is, according to a preferred embodiment of the present invention, a multilayer ceramic electronic component includes a laminate that includes laminated ceramic layers and a plurality of internal electrodes disposed between the ceramic layers, an end of each of the internal electrodes being exposed at a predetermined surface of the laminate, and a plated layer disposed directly on the predetermined surface of the laminate.

The plated layer is preferably primarily made of a specific metal and includes a plurality of plated sublayers being in contact with each other, the plated sublayers having different crystal orientations at their interface.

Preferably, a multilayer ceramic electronic component according to a preferred embodiment of the present invention further includes an interdiffusion layer between the plated layer and the internal electrodes, the interdiffusion layer including both the specific metal component of the plated layer and a metal component of the internal electrodes, wherein the interdiffusion layer preferably extends at least about 2 μm, for example, from the predetermined surface of the laminate in the internal electrodes side.

In a method for manufacturing a multilayer ceramic electronic component according to a preferred embodiment of the present invention, a plurality of plated sublayers are sequentially formed on a predetermined surface of a laminate to form a plated layer. Heat treatment is performed every time a plated sublayer is formed. This stepwise heat treatment can effectively remove water in a plating solution entering the laminate, as well as water in the plated sublayer, thus preventing the occurrence of blisters associated with the heat treatment.

In a multilayer ceramic electronic component according to a preferred embodiment of the present invention, the plated layer includes a plurality of plated sublayers having different crystal orientations at their interface. This can relieve a compressive stress imposed on the plated layer in heat treatment, thus preventing the occurrence of blisters.

According to a preferred embodiment of the present invention, heat treatment after plating causes interdiffusion between the plated layer and the internal electrodes. The interdiffusion results in volume expansion between the plated layer and the internal electrodes. The volume expansion can compensate for a possible formation of a gap between the ceramic layers and the internal electrodes and a possible formation of a gap between the ceramic layers and the plated layer, thus improving the density of the laminate. This prevents water from entering the laminate after plating and therefore improves the lifetime of a multilayer ceramic electronic component in a load test under a high temperature and high humidity environment.

These and other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A multilayer ceramic electronic component 1 according to a first preferred embodiment of the present invention and a method for manufacturing the multilayer ceramic electronic component 1 are described below with reference to FIGS. 1 and 2.

Figure 1:
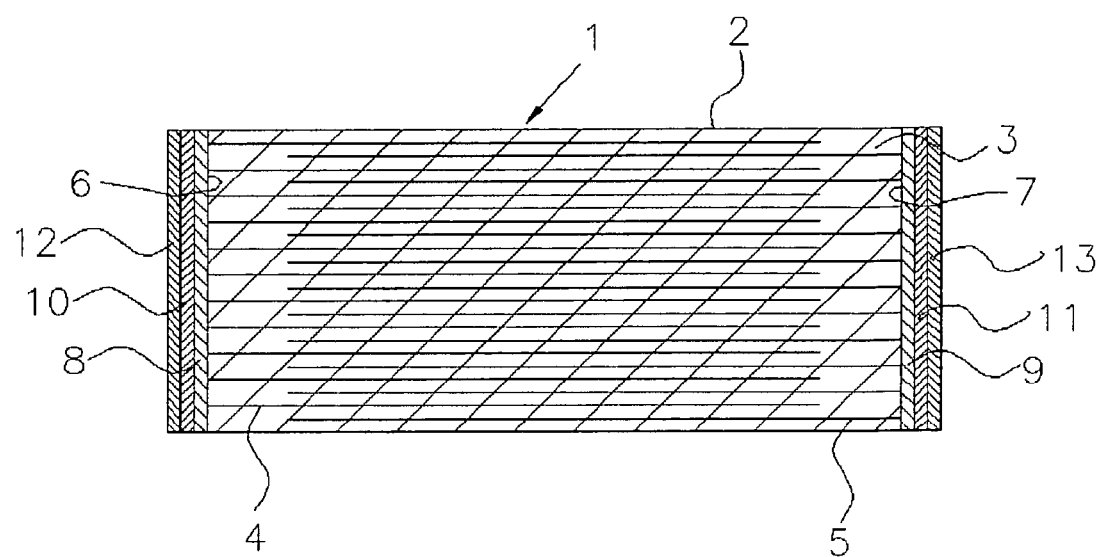
FIG. 1 is a cross-sectional view of a multilayer ceramic electronic component according to a first preferred embodiment of the present invention.

As illustrated in FIG. 1, the multilayer ceramic electronic component 1 includes a laminate 2, which includes laminated ceramic layers 3 and internal electrodes 4 and 5 alternately disposed between the ceramic layers 3. When the multilayer ceramic electronic component 1 defines a multilayer ceramic capacitor, the ceramic layers 3 are preferably formed of dielectric ceramic, for example. An end of each of the internal electrodes 4 is exposed at an end surface 6 of the laminate 2. An end of each of the internal electrodes 5 is exposed at an end surface 7. External electrodes are formed on the end surfaces 6 and 7 to electrically connect the corresponding ends of the internal electrodes 4 and 5.

The external electrodes include first plated layers 8 and 9 formed of precipitates by wet plating, such as electroplating or electroless plating. The first plated layers 8 and 9 are electrically connected directly to the internal electrodes 4 and 5. In other words, the first plated layers 8 and 9 do not include an electroconductive paste film, a vacuum-deposited film, or a sputtered film, for example.

A method for manufacturing the multilayer ceramic electronic component 1 illustrated in FIG. 1 will be described below with reference to FIG. 2, with a particular emphasis on a method for forming the first plated layers 8 and 9, which are significantly related to the formation of blisters. FIG. 2 is a fragmentary enlarged cross-sectional view of a laminate 2 illustrated in FIG. 1 and illustrates the vicinity of the end surface 6 at which the internal electrodes 4 are exposed. The following description also substantially applies to the end surface 7 and the internal electrodes 5 exposed at the end surface 7.

First, the laminate 2 is prepared. The laminate 2 includes the laminated ceramic layers 3 and the internal electrodes 4 and 5 alternately disposed between the ceramic layers 3. An end of each of the internal electrodes 4 is exposed at the end surface 6. An end of each of the internal electrodes 5 is exposed at the end surface 7. If the internal electrodes 4 or 5 are not sufficiently exposed at the end surface 6 or 7, the ceramic layers 3 are preferably polished by sandblasting or barrel polishing, for example, to expose the internal electrodes 4 or 5 on the end surface 6 or 7.

This is followed by a step of forming first plated layers 8 and 9 on the end surfaces 6 and 7 of the laminate 2 to electrically connect the corresponding ends of the internal electrodes 4 and 5 exposed at the end surfaces 6 and 7.

Figure 2:
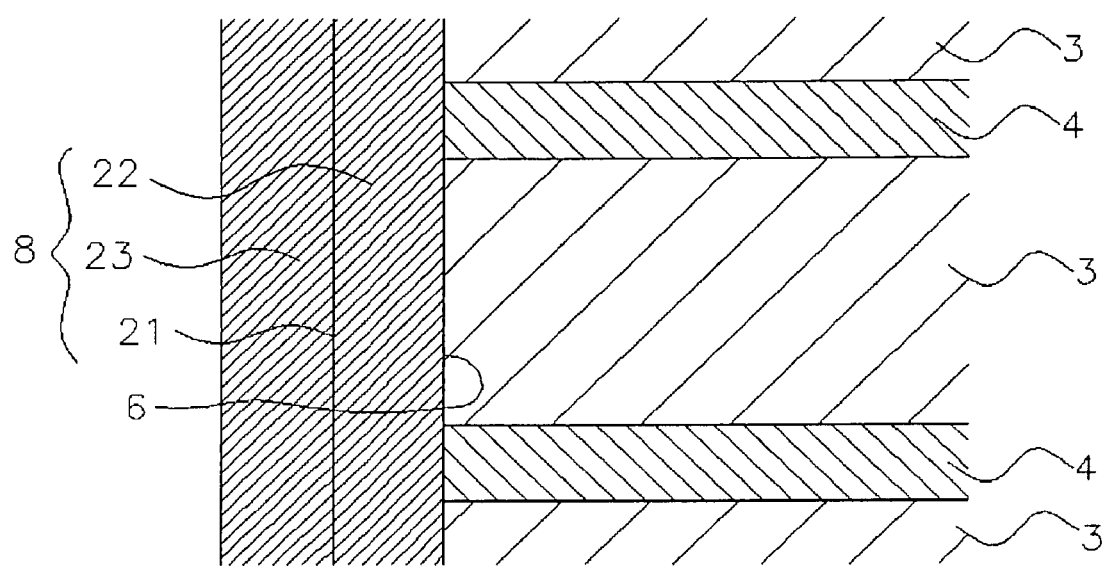
FIG. 2 is a fragmentary enlarged cross-sectional view of a laminate illustrated in FIG. 1.
Figure 3:
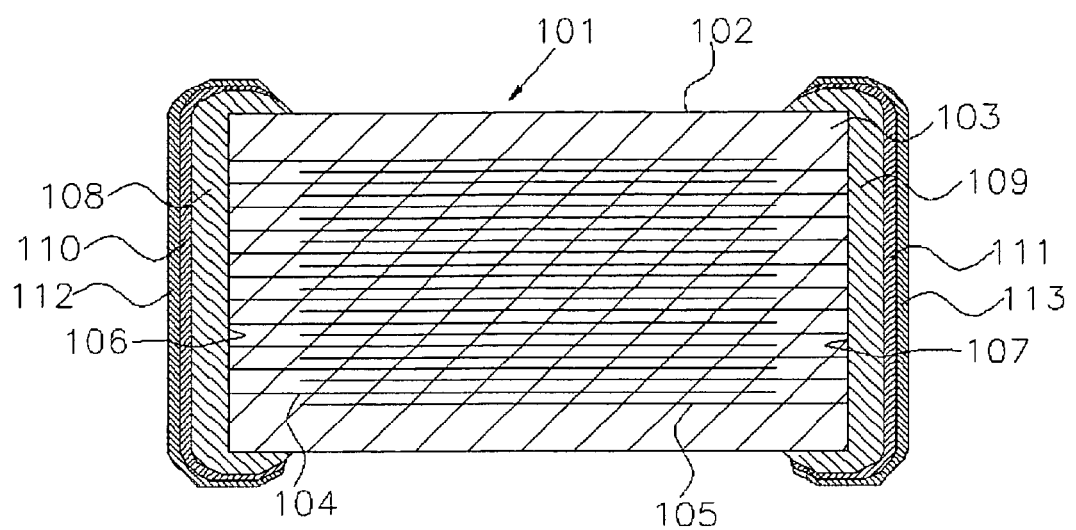
FIG. 3 is a cross-sectional view of a known multilayer ceramic electronic component.

As illustrated in the enlarged view of FIG. 2, the step of forming a first plated layer 8 includes a first substep of depositing precipitates on the ends of the internal electrodes 4 exposed at the end surface 6 of the laminate 2 and growing the precipitates to coalesce into a continuous plated sublayer 22 directly on the end surface 6.

The laminate 2 including the first plated sublayer 22 is then heat-treated preferably at a temperature of at least about 800° C., for example.

The first plated sublayer 22 is preferably coated with the same metal that defines the first plated sublayer 22 to form a second plated sublayer 23.

The laminate 2 including the second plated sublayer 23 is then heat-treated at a temperature of at least about 800° C., for example. Thus, the first plated layer 8 including the first plated sublayer 22 and the second plated sublayer 23 is formed.

Since the first plated layer 8 is formed by at least two cycles of plating and heat treatment, water in the laminate 2 and the first plated layer 8 is effectively removed by the heat treatment.

In the first plated layer 8, the first plated sublayer 22 and the second plated sublayer 23 have different crystal orientations at their interface 21. The interface 21 is formed by heat treatment after the first plated sublayer 22 has been formed. The first plated sublayer 22 and the second plated sublayer 23 have different metallic crystal orientations on the opposite sides of the interface 21.

The presence of the interface 21, which interrupts the crystal orientation, in the first plated layer 8 relieves a compressive stress which contributes to the occurrence of blisters, thus preventing the occurrence of blisters.

Preferably, each of the plated sublayers 22 and 23 has an average thickness of about 5 µm or less, for example. In this thickness range, water is more effectively removed by heat treatment. The compressive stress is also more effectively removed by the presence of the interface 21. Each of the plated sublayers 22 and 23 should preferably have an average thickness of at least about 0.1 µm, for example, to ensure an electrical connection between the internal electrodes.

While the first plated layer 8 includes two plated sublayers 22 and 23 and one interface 21 in FIG. 2, it may include a greater number of plated sublayers and interfaces. In this case, the cycle of plating and heat treatment is preferably performed at least three times, for example. This can effectively increase the thickness of the first plated layer 8.

As illustrated in FIG. 1, additional plated layers made of a metal different from that of the first plated layers 8 and 9, that is, second plated layers 10 and 11 and third plated layers 12 and 13, for example, may be formed on the first plated layers 8 and 9, if necessary. Because these additional plated layers do not significantly contribute to the occurrence of blisters, they do not necessarily include a plurality of plated sublayers.

The plating metal of the first plated layers 8 and 9 is preferably Cu, for example, due to its throwing power. In this case, the second plated layers 10 and 11 are preferably formed of Ni, for example, which is resistant to solder leaching, and the third plated layers 12 and 13 are preferably formed of Sn, for example, which has excellent solder wettability. A two-layered structure having first plated layers 8 and 9 formed of Ni and second plated layers 10 and 11 formed of Sn is also preferred.

In a multilayer ceramic electronic component according to preferred embodiments of the present invention, when the internal electrodes 4 and 5 include a different metal from that of the first plated layers 8 and 9, performance of a few heat treatments causes interdiffusion therebetween. The interdiffusion results in the formation of an interdiffusion layer (not shown) between the internal electrodes 4 and 5 and the first plated layers 8 and 9. The interdiffusion causes volume expansion between the internal electrodes 4 and 5 and the first plated layers 8 and 9, thus filling a gap between the ceramic layers 3 and the internal electrodes 4 and 5 and a gap between the ceramic layers 3 and the first plated layers 8 and 9. This prevents water from entering the laminate 2. The interdiffusion can be detected by a mapping analysis of a cross section using a wavelength dispersive X-ray microanalyzer (WDX).

The internal electrodes 4 and 5 may be primarily made of Ni, Cu, Pd, or Ag, for example. Preferably, the main component metal of the internal electrodes 4 and 5 and the main component metal of the first plated layers 8 and 9 are Ni and Cu, Cu and Ni, and Pd or Ag and Cu or Ni, respectively, for example.

The method for forming the first plated sublayer 22 utilizes the growth ability and spreadability of precipitates. To enhance the coalescence of the precipitates, the distance between adjacent internal electrodes is preferably about 10 µm or less, for example, in electroplating and about 20 µm or less, for example, in electroless plating.

The exposed ends of the internal electrodes 4 and 5 preferably are recessed no more than about 1 µm, for example, from the end surfaces 6 and 7 of the laminate 2 before the formation of the first plated sublayer 22. The recession of the exposed ends of more than about 1 µm inhibits electron supply to the exposed ends, thus reducing precipitates. The recession may be reduced by polishing, such as sandblasting or barrel polishing, for example.

Preferably, the ends of the internal electrodes 4 and 5 protrude from the end surfaces 6 and 7 of the laminate 2 before plating. The protrusions of the internal electrodes 4 and 5 are preferably formed by adjusting the conditions of polishing, such as sandblasting. The polishing extends the protrusions along the end surfaces 6 and 7, thus reducing the distance between precipitates on the ends of adjacent internal electrodes. To enhance the coalescence of the precipitates, the distance between adjacent internal electrodes is preferably about 20 µm or less, for example, in electroplating and preferably about 50 µm or less, for example, in electroless plating.

While the external electrodes of a ceramic electronic component according to preferred embodiments of the present invention preferably are substantially formed of a plated layer alone, a paste electrode may also be formed provided that the paste electrode is not directly involved in the connection of the internal electrodes 4 and 5. For example, a thick paste electrode may be formed to extend the external electrodes to a surface adjacent to the end surfaces 6 and 7. This thick paste electrode can facilitate solder mounting and effectively prevent water from entering the laminate 2 from edges of the plated layers 8 and 9. Preferably, the paste electrode is formed after the first plated layers 8 and 9 are formed. This is because the paste electrode can be baked simultaneously with the final heat treatment of the first plated layers 8 and 9. If necessary, second and third plated layers may be formed.

While preferred embodiments of the present invention have been described with reference to the drawings, various modifications may be made without departing from the scope of the present invention.

For example, a multilayer ceramic electronic component according to preferred embodiments of the present invention may also be applied to multilayer chip capacitors, multilayer chip inductors, and multilayer chip thermistors, for example.

Thus, the ceramic layers of a multilayer ceramic electronic component may be formed of any material having an electrical insulating function. The ceramic layers may be formed of piezoelectric ceramic, semiconductor ceramic, or magnetic ceramic, as well as dielectric ceramic, for example.

While the multilayer ceramic electronic component 1 has a pair of external electrodes in FIG. 1, it may have three or more external electrodes. For example, the multilayer ceramic electronic component 1 may preferably be of an array type having two or more pairs of external electrodes, for example.

Preferred embodiments of the present invention are further described below with reference to examples. Table 1 shows seven samples No. 1 to No. 7, which differ in the number of cycles of plating and heat treatment and the thickness of a plated sublayer.

A laminate for use in a multilayer ceramic capacitor was prepared as a laminate of a multilayer ceramic electronic component. The laminate included ceramic layers made of barium titanate-based dielectric ceramic and internal electrodes primarily made of Ni. The laminate had a length of about 1.9 mm, a width of about 1.05 mm, and a height of about 1.05 mm. Each of the ceramic layers had a thickness of about 2.0 µm. The distance between adjacent internal electrodes on a surface at which the internal electrodes were exposed was about 4.0 µm.

The laminate and electroconductive media having a diameter of about 1.3 mm were disposed in a horizontal rotating barrel. The rotating barrel was immersed in a Cu plating strike bath controlled at a pH of about 8.7 and a temperature of about 25° C. An electric current was applied at a density of about 0.10 A/dm$^2$ for a predetermined period of time while the rotating barrel was rotated at a peripheral speed of about 2.6 m/min. The resulting first plated sublayer was formed of Cu and had a thickness shown in Table 1. The Cu plating strike bath included 14 g/L copper diphosphate, 120 g/L diphosphoric acid, and 10 g/L potassium oxalate.

For the samples No. 1 to No. 4, the laminate was removed from the barrel and was heat-treated at an oxygen concentration of about 5 ppm or less and a temperature of about 800° C. The in-out time was about 120 minutes, and the holding time at the maximum temperature was about 18 minutes.

The samples No. 1 to No. 4 were again disposed in the barrel, which was immersed in a Cu plating diphosphoric acid bath controlled at a pH of about 8.8 and a temperature of about 55° C. (C. Uyemura & Co., Ltd., a Pyrobrite (trade name) process). An electric current was applied at a density of about 0.30 A/dm² for a predetermined period of time while the barrel was rotated at a peripheral speed of about 2.6 m/min. The resulting second plated sublayer was formed of Cu and had a thickness shown in Table 1.

The samples No. 1 to No. 4 were removed from the barrel and were heat-treated at an oxygen concentration of about 5 ppm or less and a temperature of about 800° C. The in-out time was about 30 minutes, and the holding time at the maximum temperature was about 4.5 minutes.

For the samples No. 3 and No. 4, a third plated sublayer having a thickness shown in Table 1 was formed and heat-treated as in the second plated sublayer. For the sample No. 4, the formation of a fourth plated sublayer, heat treatment, the formation of a fifth plated sublayer, and heat treatment were sequentially performed as in the third plated sublayer.

Through these steps, the samples No. 1 to No. 7 having a first plated layer were prepared. Observation of a cross section of the first plated layer in the samples No. 1 to No. 4 showed the presence of an interface having different crystal orientations on opposite sides thereof.

The entire surface of the first plated layer in 100 of each of the samples No. 1 to No. 7 was checked for blisters with a microscope. The first plated layer was judged to be defective if a blister having a diameter of at least about 10 μm was found therein. Table 1 shows the percentage of defective samples among 100 of each of the samples.

TABLE 1

| Sample No. | Number of cycles | Average thickness of plated sublayer (μm) | Thickness of first plated layer (μm) | Percentage of defective samples (%) |
|---|---|---|---|---|
| 1 | 2 | 1st plated sublayer: 3<br>2nd plated sublayer: 8 | 11 | 0 |
| 2 | 2 | 1st plated sublayer: 10<br>2nd plated sublayer: 4 | 14 | 0 |
| 3 | 3 | 1st plated sublayer: 8<br>2nd plated sublayer: 8<br>3rd plated sublayer: 4 | 20 | 0 |
| 4 | 5 | 1st plated sublayer: 10<br>2nd plated sublayer: 10<br>3rd plated sublayer: 10<br>4th plated sublayer: 10<br>5th plated sublayer: 10 | 50 | 0 |
| 5 | 1 | 1st plated sublayer: 11 | 11 | 73 |
| 6 | 1 | 1st plated sublayer: 12 | 12 | 81 |
| 7 | 1 | 1st plated sublayer: 20 | 20 | 100 |

Table 1 shows that the samples No. 1 to No. 4, in which at least two cycles of plating and heat treatment were performed, have a percentage of defective samples of 0%.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A method for manufacturing a multilayer ceramic electronic component, comprising the steps of:
    preparing a laminate that includes laminated ceramic layers and internal electrodes disposed between the ceramic layers, an end of each of the internal electrodes being exposed at a predetermined surface of the laminate; and
    forming a plated layer on the predetermined surface of the laminate to electrically connect the ends of the internal electrodes to each other; wherein
    the step of forming a plated layer comprises:
    a first substep of depositing precipitates primarily composed of a specific metal on the end of each of the internal electrodes exposed at the predetermined surface of the laminate and growing the precipitates to coalesce into a continuous plated sublayer; and
    a second substep of heat-treating the laminate including the plated sublayer at a temperature of at least about 800° C.; and
    forming a plated layer including a plurality of plated sublayers by continuously performing at least two cycles of the first substep and the second substep.

2. The method for manufacturing a multilayer ceramic electronic component according to claim 1, wherein each of the plated sublayers has a thickness in the range of about 0.1 μm to about 5 μm.

3. The method for manufacturing a multilayer ceramic electronic component according to claim 1, wherein the specific metal is Cu or Ni.

4. A multilayer ceramic electronic component comprising:
    a laminate including laminated ceramic layers and internal electrodes disposed between the ceramic layers, an end of each of the internal electrodes being exposed at a predetermined surface of the laminate; and
    a plated layer disposed directly on the predetermined surface of the laminate; wherein
    the plated layer is primarily composed of a specific metal and includes a plurality of plated sublayers in contact with each other, the plurality of plated sublayers having different crystal orientations at an interface thereof; and
    all of the plurality of plated sublayers are made of the same specific metal.

5. The multilayer ceramic electronic component according to claim 4, wherein each of the plurality of plated sublayers has a thickness in the range of about 0.1 μm to about 5 μm.

6. The multilayer ceramic electronic component according to claim 4, wherein the specific metal is Cu or Ni.

7. The multilayer ceramic electronic component according to claim 4, further comprising:
    an interdiffusion layer between the plated layer and the internal electrodes, the interdiffusion layer including both the specific metal component of the plated layer and a metal component of the internal electrodes; wherein
    the interdiffusion layer extends at least about 2 μm from the predetermined surface of the laminate in the internal electrodes side.

* * * * *